United States Patent [19]
Givoni et al.

[11] Patent Number: 5,655,385
[45] Date of Patent: Aug. 12, 1997

[54] METHOD OF SUPPLYING COOLING AIR AND COOLING SYSTEM

[75] Inventors: Baruch Givoni, Santa Monica, Calif.; Satoshi Yajima, Tokyo, Japan

[73] Assignee: Fujita Corporation, Tokyo, Japan

[21] Appl. No.: 429,235

[22] Filed: Apr. 25, 1995

[30] Foreign Application Priority Data

Feb. 9, 1995 [JP] Japan ..................... 7-046391

[51] Int. Cl.⁶ ..................... F28D 5/00
[52] U.S. Cl. ............... 62/310; 62/304; 261/116; 261/DIG. 11
[58] Field of Search ............. 62/304, 309, 310; 261/116, DIG. 3, DIG. 11

[56] References Cited

U.S. PATENT DOCUMENTS

| | | | |
|---|---|---|---|
| 150,920 | 5/1874 | Whitman | 62/309 |
| 1,252,472 | 1/1918 | Miles | 62/310 |
| 2,022,740 | 12/1935 | Rowell | 261/116 |
| 2,088,962 | 8/1937 | Kleucker | 261/116 |
| 4,284,128 | 8/1981 | Nelson | 62/DIG. 16 |

*Primary Examiner*—John M. Sollecito
*Attorney, Agent, or Firm*—Ronald R. Snider

[57] ABSTRACT

A cooling system typically incorporated in an outdoor rest facility has a substantially vertical tower extending vertically through the roof of the outdoor rest facility and having an air passageway defined vertically therein. The air passageway has an air inlet port defined in an upper end thereof for introducing air into the air passageway. A water ejector is disposed in the upper end of the air passageway for ejecting a shower of water downwardly through the air passageway from the upper end of the air passageway. A water retriever is disposed downwardly of and spaced from the tower, for retrieving the shower of water falling through the air passageway. An air outlet port is defined between an open lower end of the tower and the water retriever, for discharging air cooled by the shower of water out of the air passageway.

9 Claims, 1 Drawing Sheet

METHOD OF SUPPLYING COOLING AIR AND COOLING SYSTEM

BACKGROUND OF THE INVENTION

1. Field of the Invention

The present invention relates to a method of supplying cooled air in an indoor space or an outdoor location such as a rest area or the like, and a cooling system.

2. Description of the Related Art

The heat of summer in outdoor locations such as outdoor spaces or the like can generally be reduced by sunshades provided by vegetables or the like, rather than air conditioning units. This is because the air conditioning units have a limited cooling capacity and are suitable for use in closed indoor spaces, but not in open outdoor spaces.

One proposal for minimizing the heat of summer in outdoor areas is a cooling tower that is installed outdoors to discharge cooled air in an outdoor space.

Cooling towers, which Rind frequent use in deserts, have a tower body vertically disposed on the ground and having a vertical space defined therein. The tower body has an air inlet port defined in its upper end and a water evaporating member mounted in the air inlet port, the water evaporating member being supplied with water.

When ambient air introduced into the tower body through the air inlet port passes through the water evaporating member, the air is cooled and flows downwardly into the vertical space. Since the cooled air has a low specific gravity, it flows downwardly into a lower portion of the vertical space, and is then discharged as cooled air from an air outlet potion that is defined in the lower end of the tower body.

However, since the cooled air flows downwardly by gravity in the tower body, no distinct cooled air stream is developed in the tower body unless the ambient air has a very high temperature and is dry.

Specifically, in deserts which usually have an ambient air temperature of 40° C. or higher and a humidity of about 20% a cooling tower which is about 7 m high allows air cooled 10° C. or more to flow downwardly in the tower body at a speed ranging from 0.3 to 0.5 m/s. In cooler geographic regions such as Japan during summer, sufficiently cooled air is not effectively generated in a cooling tower having a height of about 15 m because the maximum ambient air temperature is about 35° C. and the humidity is somewhere between 50 and 70%.

SUMMARY OF THE INVENTION

It is therefore an object of the present invention to provide a method of supplying cooled air from a reliably cooled air stream which is produced irrespective of an ambient air temperature and humidity.

Another object of the present invention is to provided a cooling system capable of reliably producing cooled air stream irrespective of an ambient air temperature and humidity.

According to the present invention, there is provided a method of supplying cooled air, comprising the steps of ejecting a shower of water downwardly through an air passageway from an upper end of the air passageway, generating an air stream flowing downwardly through the air passageway with the shower of water while drawing ambient air from the upper end of the air passageway into the air passageway, cooling the air stream by depriving the air stream of heat when water droplets of the shower of water are evaporated, and discharging the cooled air stream out of the air passageway from a lower end of the air passageway.

The air passageway extends vertically through a roof of a building, whereby the cooled air stream is discharged from the lower end of the air passageway into a space below the roof.

According to the present invention, there is also provided a cooling system comprising a substantially vertical tower having an air passageway defined vertically therein, the air passageway having an open lower end, an air inlet port defined in an upper end of the air passageway for introducing air into the air passageway, water ejecting means for ejecting a shower of water downwardly through the air passageway from the upper end of the air passageway, water retrieving means disposed downwardly of and spaced from the tower, for retrieving the shower of water falling through the air passageway, and an air outlet port defined between the open lower end of the tower and the water retrieving means, for discharging air cooled by the shower of water out of the air passageway.

The cooling system further comprises a building having a roof, the tower having a portion projecting upwardly from the roof, the air passageway communicating through the air outlet port with a space below the roof. The tower comprises a pipe and an insulation covering an outer circumferential surface of the portion of the pipe which projects upwardly from the roof. The pipe extends through the roof, the pipe having a lower end disposed below the roof. The building has a plurality of columns, the roof being supported on the columns, the building being used as an outdoor rest facility.

The water ejecting means comprises a shower nozzle disposed in the upper end of the air passageway, a water tank for storing water to be supplied to the shower nozzle, a water supply pipe interconnecting the shower nozzle and the water tank, and a pump connected to the water supply pipe for delivering water from the water tank through the water supply pipe to the shower nozzle.

The water retrieving means comprises a water tank disposed below the air passageway and having an upper opening, for retrieving the shower of water from the air passageway through the upper opening, the water ejecting means comprising means for circulating water from the water tank for reuse by the water ejecting means.

The air inlet port is defined in an upper end of the tower, further comprising a roof disposed over the upper end of the tower for preventing rainwater from entering the air passageway.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
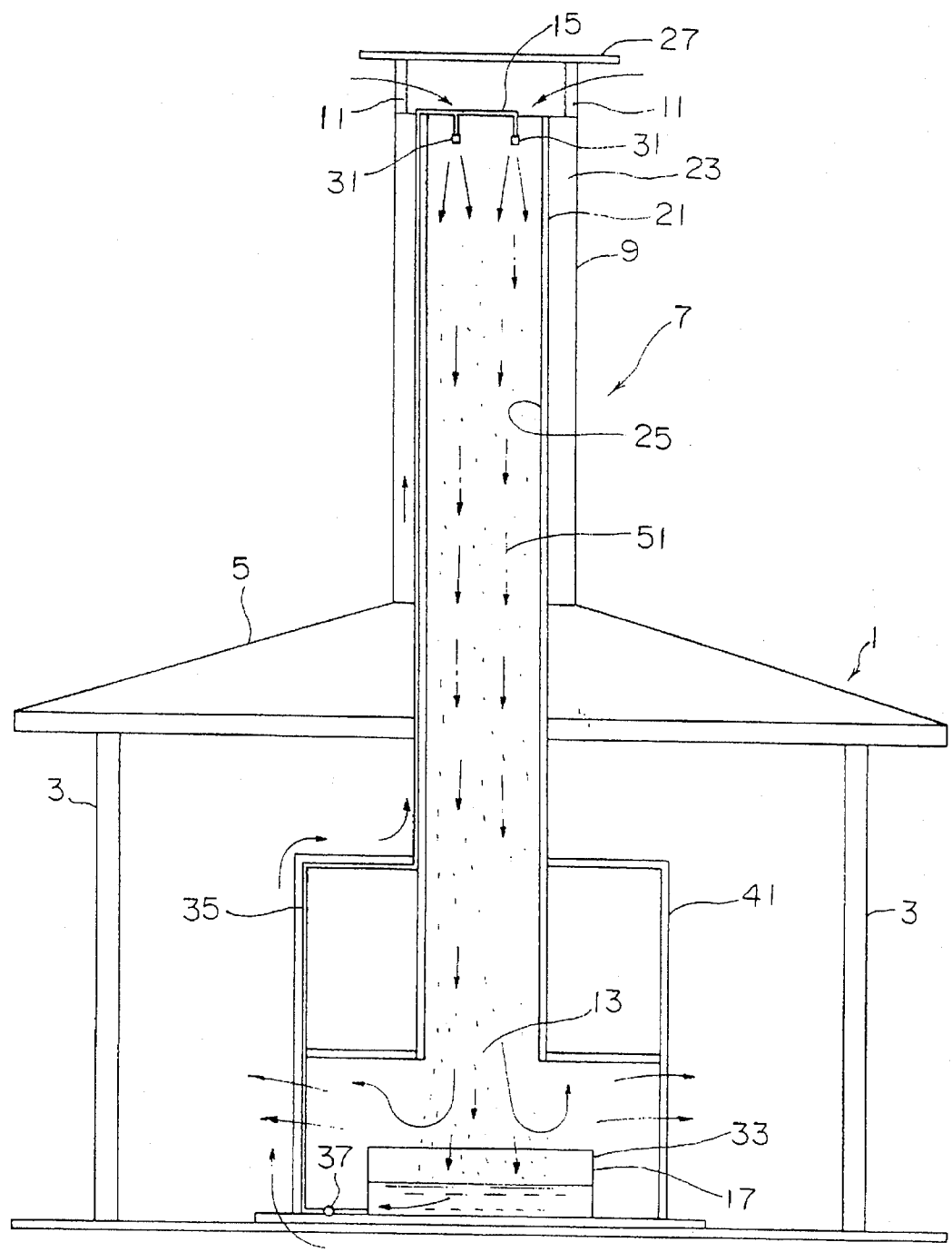
FIG. 1 is a sectional front elevational view of a cooling system according to the present invention.

As shown in FIG. 1, a cooling system 7 according to the present invention is incorporated in an outdoor rest facility 1 which comprises a plurality of columns 3 and a roof 5 supported on the columns 3.

The cooling system 7 comprises a vertical tower 9, a plurality of air inlet ports 11 defined in an upper end of the tower 9, an air outlet port 13 defined in a lower end of the tower 9, a water ejector 15, and a water retriever 17.

The vertical tower 9 is composed of a pipe 21 extending vertically through the roof 5, and an insulation 23 covering the outer circumferential surface of a portion of the pipe 21 which is exposed above the roof 5.

The pipe 21 defines therein a vertical air passageway 25 having open upper and lower ends. The lower end of the pipe 21 extends to a position that is slightly lower than a point intermediate between the ceiling and floor of the rest facility 1.

The air inlet ports 11 are defined at circumferentially spaced intervals in the upper end of the insulation 23 to which there is attached a roof 27 for preventing rainwater from entering the air passageway 25.

The pipe 21 may be made of synthetic resin, metal, etc., and the insulation 23 may be made of wood, concrete, etc.

The water ejector 15 serves to eject a shower of water from the upper end of the air passageway 25 downwardly into the air passageway 25. The water ejector 15 comprises a plurality of shower nozzles 31 mounted on upper end of the air passageway 25 and directed downwardly into the air passageway 25, a water tank 33 mounted on the floor of the rest facility 1 below the air outlet port 13, for supplying water to the shower nozzles 31, a water supply pipe 35 interconnecting the shower nozzles 31 and the water tank 33, and a pump 37 connected to the water supply pipe 35 for delivering water from the water tank 33 to the shower nozzles 31.

When the pump 37 is operated, water in the water tank 33 is supplied through the water supply pipe 35 to the shower nozzles 31, from which a shower of water is ejected from the upper end of the air passageway 25 downwardly into the air passageway 25.

The pipe 21 has a lower portion supported by a frame 41 which is mounted on the floor of the rest facility 1 below the ceiling thereof. The water tank 33 is positioned within the frame 41 downwardly of the pipe 21, and has an upper opening for retrieving the shower of water which has fallen through the water passageway 25.

The air outlet port 13 is defined between the water level in the water tank 33 and the open lower end of the pipe 21.

Since the water is circulated for reuse between the water tank 33 and the shower nozzles 31, the water tank 33 doubles as both part of the water ejector 15 and the water retriever 17.

Operation of the cooling system 7 will be described below.

When the pump 37 is operated, water in the water tank 33 is supplied through the water supply pipe 35 to the shower nozzles 31, and a shower of water is ejected from the shower nozzles 31 and falls from the upper end of the air passageway 25 downwardly through the air passageway 25.

As the shower of water drops through the air passageway 25, it produces an air stream 51 flowing with the shower of water from the upper end of the air passageway 25 to the lower end thereof.

The downward air stream 51 draws ambient air from the air inlet ports 11 into the air passageway 25, and hence is continuously replenished as long as the shower of water drops through the air passageway 25.

While the shower of water is falling with the air stream 51 through the air passageway 25, the water droplets of the shower are evaporated by the air stream 51. When the water droplets of the shower are evaporated, they deprive the air stream 51 of heat. Therefore, the temperature of the air stream 51 is lowered, and the air stream 51 is discharged as cooled air from the air outlet port 13.

Since the air stream 51 is generated by the shower of water in the air passageway 25 and cooled therein by the shower of water as it is evaporated by the air stream 51, a cooled air stream is reliably developed in the air passageway 25 irrespective of the ambient temperature and humidity outside of the cooling system 7.

Experimental examples will be described below.

In one experiment, the air passageway 25 had a rectangular cross-sectional shape with a size of 600 mm×600 mm and a length of 3 m, the water tank 33 contained 150 liters of water, and four shower nozzles 31 were employed. When the ambient temperature was 35° C. and the ambient humidity was 50%, water was ejected from each of the shower nozzles 31 into the air passageway 25 at a rate of 3 liters/minute. As a result, an air stream 51 was generated at a rate of 1 m/second in the air passageway 25, and had a temperature of about 28° C. at the air outlet port 13.

In another experiment, water was ejected from each of the shower nozzles 31 into the air passageway 25 under the same structural and operating conditions as the above experiment except that the ambient temperature was 30° C. and the ambient humidity was 70%. As a result, an air stream 51 was generated at a rate of 1 m/second in the air passageway 25, and had a temperature of about 26° C. at the air outlet port 13.

The above experiments indicated that a cooled air stream was reliably developed in the air passageway 25 irrespective of the ambient temperature and humidity outside of the cooling system 7 and without an undue increase in the length of the air passageway 25, i.e., the height of the tower 9.

As the shower of water is ejected in a greater amount, the air stream 51 flows at a higher rate.

The orifice diameter of each of the shower nozzles 31 may be reduced to the extent that a mist of water can be ejected from the shower nozzles 31. The term "shower of water" employed in this specification should be interpreted as including a mist of water. As the orifice diameter of each of the shower nozzles 31 is reduced, the water droplets ejected therefrom are also reduced in size, and the air stream 51 flows at a lower rate.

In the illustrated embodiment, the water is circulated for reuse between the water tank 33 and the shower nozzles 31. However, instead of circulating the used water, the used water may be drained from the water tank 33, and fresh water may be supplied to the shower nozzles 31.

While the cooling system 7 is incorporated in the outdoor rest facility 1 in the above embodiment, the principles of the present invention may be applied to various other outdoor locations or indoor facilities such as ordinary houses, office buildings, gymnasiums, etc. For example, the tower 9 may independently be positioned near a bench for supplying cooled air to persons sitting on the bench.

According to the present invention, as described above, a cooled air stream can reliably be generated irrespective of the ambient temperature and humidity outside of the cooling system 7 and without increasing the length of the tower 9. Furthermore, the cooling system 7 can be used in a wide variety of outdoor and indoor applications.

Although a certain preferred embodiment of the present invention has been shown and described in detail, it should be understood that various changes and modifications may be made therein without departing from the scope of the appended claims.

What is claimed is:

1. A cooling system comprising:

a substantially vertical tower having an air passageway defined vertically therein, said air passageway having an open lower end;

an air inlet port defined in an upper end of said air passageway for introducing air into said air passageway;

water ejecting means for ejecting a shower of water downwardly through said air passageway from said upper end of the air passageway;

water retrieving means disposed downwardly of an spaced from said tower, for retrieving said shower of water falling through said air passageway;

further comprising a building having a roof, said tower having a portion projecting upwardly from said roof, said air passageway communicating through said air outlet port with a space below said roof;

wherein said building has a plurality of columns, said roof being supported on said columns, said building being used as an outdoor rest facility and where the area between such columns is open to outdoor space.

2. A cooling system according to claim 1, wherein said tower comprises a pipe and an insulation covering an outer circumferential surface of said portion of the pipe which projects upwardly from said roof.

3. A cooling system according to claim 2, wherein said pipe extends through said roof, said pipe having a lower end disposed below said roof.

4. A cooling system according to claim 1, wherein said water ejecting means comprises:

a shower nozzle disposed in said upper end of the air passageway;

a water tank for storing water to be supplied to said shower nozzle;

a water supply pipe interconnecting said shower nozzle and said water tank; and a pump connected to said water supply pipe for delivering water from said water tank through said water supply pipe to said shower nozzle.

5. A cooling system according to claim 1, wherein said water retrieving means comprises:

a water tank disposed below said air passageway and having an upper opening, for retrieving the shower of water from said air passageway through said upper opening;

said water ejecting means comprising means for circulating water from said water tank for reuse by said water ejecting means.

6. A cooling system according to claim 1, wherein said air inlet port is defined in an upper end of said tower, further comprising a roof disposed over said upper end of said tower for preventing rainwater from entering said air passageway.

7. A cooling system according to claim 1 wherein said ejecting of a shower of water downwardly is the only means for generating said air stream flowing downwardly through said air passageway.

8. A cooling system according to claim 1 wherein said ejecting of a shower of water downwardly is the only means for generating said air stream flowing downwardly through said air passageway.

9. A cooling system in accordance with claim 1 wherein said shower of water causes evaporation of water within said air passageway thereby reducing temperature of air in said passageway.

* * * * *